(12) United States Patent
Lublin et al.

(10) Patent No.: US 8,650,563 B2
(45) Date of Patent: *Feb. 11, 2014

(54) IDENTIFICATION AND PLACEMENT OF NEW VIRTUAL MACHINES TO REDUCE MEMORY CONSUMPTION BASED ON SHARED IMAGES WITH HOSTED VIRTUAL MACHINES

(75) Inventors: Uri Lublin, Raanana (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 323 days.

This patent is subject to a terminal disclaimer.

(21) Appl. No.: 12/714,053

(22) Filed: Feb. 26, 2010

(65) Prior Publication Data

US 2011/0214123 A1    Sep. 1, 2011

(51) Int. Cl.
   *G06F 9/455*    (2006.01)
   *G06F 9/50*    (2006.01)

(52) U.S. Cl.
   USPC ............................................. 718/1; 718/102

(58) Field of Classification Search
   None
   See application file for complete search history.

(56) References Cited

U.S. PATENT DOCUMENTS

| | | | |
|---|---|---|---|
| 8,140,812 B2 | 3/2012 | Arroyo et al. | |
| 8,141,075 B1 * | 3/2012 | Chawla et al. | 718/1 |
| 8,141,090 B1 * | 3/2012 | Graupner et al. | 718/104 |
| 8,185,547 B1 | 5/2012 | Ordonez | |
| 8,191,065 B2 * | 5/2012 | Frank | 718/1 |
| 8,307,362 B1 * | 11/2012 | Gong et al. | 718/1 |
| 8,407,448 B1 * | 3/2013 | Hayden et al. | 711/203 |
| 2005/0268298 A1 | 12/2005 | Hunt et al. | |
| 2006/0218544 A1 * | 9/2006 | Chakraborty et al. | 717/168 |
| 2009/0055507 A1 * | 2/2009 | Oeda | 709/216 |
| 2009/0070771 A1 | 3/2009 | Yuyitung et al. | |
| 2009/0172662 A1 | 7/2009 | Liu | |
| 2009/0228629 A1 | 9/2009 | Gebhart et al. | |
| 2010/0095297 A1 * | 4/2010 | Sethi et al. | 718/1 |
| 2010/0107159 A1 * | 4/2010 | Radhakrishnan et al. | 718/1 |
| 2010/0250744 A1 * | 9/2010 | Hadad et al. | 709/226 |
| 2011/0004735 A1 | 1/2011 | Arroyo et al. | |
| 2011/0131568 A1 | 6/2011 | Heim | |

OTHER PUBLICATIONS

Eidus, "KSM—dynamic page sharing driver for linux" article.*
Qumranet, Increasing Virtual Machine Density With KSM (2008).*
U.S. Appl. No. 12/419,256, filed Apr. 6, 2009, Frank.
Galvin, Peter Baer, "VMware vSphere Vs. Microsoft Hyper-V: A Technical Analysis," Corporate Technologies, CTI Strategy White Paper, 2009, 32 Pages.
USPTO, Office Action for U.S. Appl. No. 12/714,033 mailed on Jun. 5, 2012.
USPTO, Notice of Allowance for U.S. Appl. No. 12/714,043 mailed on Apr. 2, 2012.

(Continued)

*Primary Examiner* — Meng An
*Assistant Examiner* — Benjamin Wu
(74) *Attorney, Agent, or Firm* — Lowenstein Sandler LLP

(57) ABSTRACT

A mechanism for optimal placement of VMs based on shared images is disclosed. A method of embodiments of the invention includes identifying a virtual machine (VM) image of a new VM to be placed by a host controller on one of a plurality of candidate host machines, for each candidate host machine of the plurality of candidate host machines, identifying a VM image for each VM hosted by the candidate host machine, and determining the candidate host with the most VMs having identical VM images to the new VM.

18 Claims, 4 Drawing Sheets

(56) References Cited

OTHER PUBLICATIONS

USPTO, Final Office Action for U.S. Appl. No. 12/714,033 mailed on Nov. 6, 2012.
USPTO, Advisory Action for U.S. Appl. No. 12/714,033 mailed on Jan. 23, 2013.
USPTO, Office Action for U.S. Appl. No. 12/714,033 mailed Mar. 27, 2013.
USPTO, Notice of Allowance for U.S. Appl. No. 12/714,043 mailed Jun. 7, 2012.
USPTO, Notice of Allowance for U.S. Appl. No. 12/714,033 mailed Sep. 3, 2013.

* cited by examiner

200

Identify characteristics of a new VM to be placed
210

Identify potential candidate host machines that may host the new VM
220

For each identified candidate host, determine characteristics of each VM on the candidate host by communications with a VM agent on the candidate host
230

Identify the candidate host having the most VMs with similar characteristics to the new VM as the optimum host to reduce memory consumption in a scheduling algorithm
240

*Fig. 2*

IDENTIFICATION AND PLACEMENT OF NEW VIRTUAL MACHINES TO REDUCE MEMORY CONSUMPTION BASED ON SHARED IMAGES WITH HOSTED VIRTUAL MACHINES

RELATED APPLICATION

The present application is related to co-filed U.S. patent application Ser. No. 12/714,033 entitled "Mechanism for Optimizing Initial Placement of Virtual Machines to Reduce Memory Consumption Based on Similar Characteristics", and co-filed U.S. patent application Ser. No. 12/714,043 entitled "Mechanism for Dynamic Placement of Virtual Machines During Live Migration Based on Memory", which are both assigned to the assignee of the present application.

TECHNICAL FIELD

The embodiments of the invention relate generally to virtual machine (VM) systems and, more specifically, relate to optimal placement of VMs based on shared images.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

In some virtualization systems, the host is a centralized server that is partitioned into multiple VMs to provide virtual desktops to users within an enterprise. A problem with centralized hosting of VMs is the use of shared storage amongst the VMs. Typically, each VM is allocated some minimum storage space out of the shared pool of storage. Because the total amount of storage in a shared pool of storage is a fixed amount, conserving disk space becomes an important consideration in virtualization systems. The storage allocation per VM is usually a sparse amount that is allocated on-demand; rather than allocating to each VM the maximum amount of storage that the VM may use. Virtualization systems require storage allocation in this sparse manner in order to conserve disk space for use only by VM systems that require the storage.

One exemplary use of the shared storage for VMs is to store an image template of a VM, so as to reduce or eliminate the need to install an OS and applications in every copy of a VM on a host machine and to reduce disk image size. This image template may include a codebase of an operating system (a guest operating system) and applications running on the guest operating system, as well as libraries and data used by the guest operating system and the applications. The size of a typical VM image is substantial. For example, an enterprise's virtual machine image is usually more than 10 GB. Hence, in an enterprise with 1,000 users, the storage requirement for virtual machine images is likely to exceed 10 TB. Maintaining such a large amount of storage is expensive and inefficient.

Most virtualization systems include one or more clusters of host machines that each run multiple VMs. Upon initialization of a new VM, a host machine must be selected to host this VM. Many factors may be considered in the initial placement of this VM, including, but not limited to, CPU usage, power consumption considerations, and so on. A mechanism for optimizing the initial placement of a VM to consider reduction of memory consumption as part of the multiple factors of initial placement would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a flow diagram illustrating a method for optimizing initial placement of virtual machines (VMs) to reduce memory consumption based on similar characteristics of VMs according to an embodiment of the invention;

DETAILED DESCRIPTION

Figure 1:
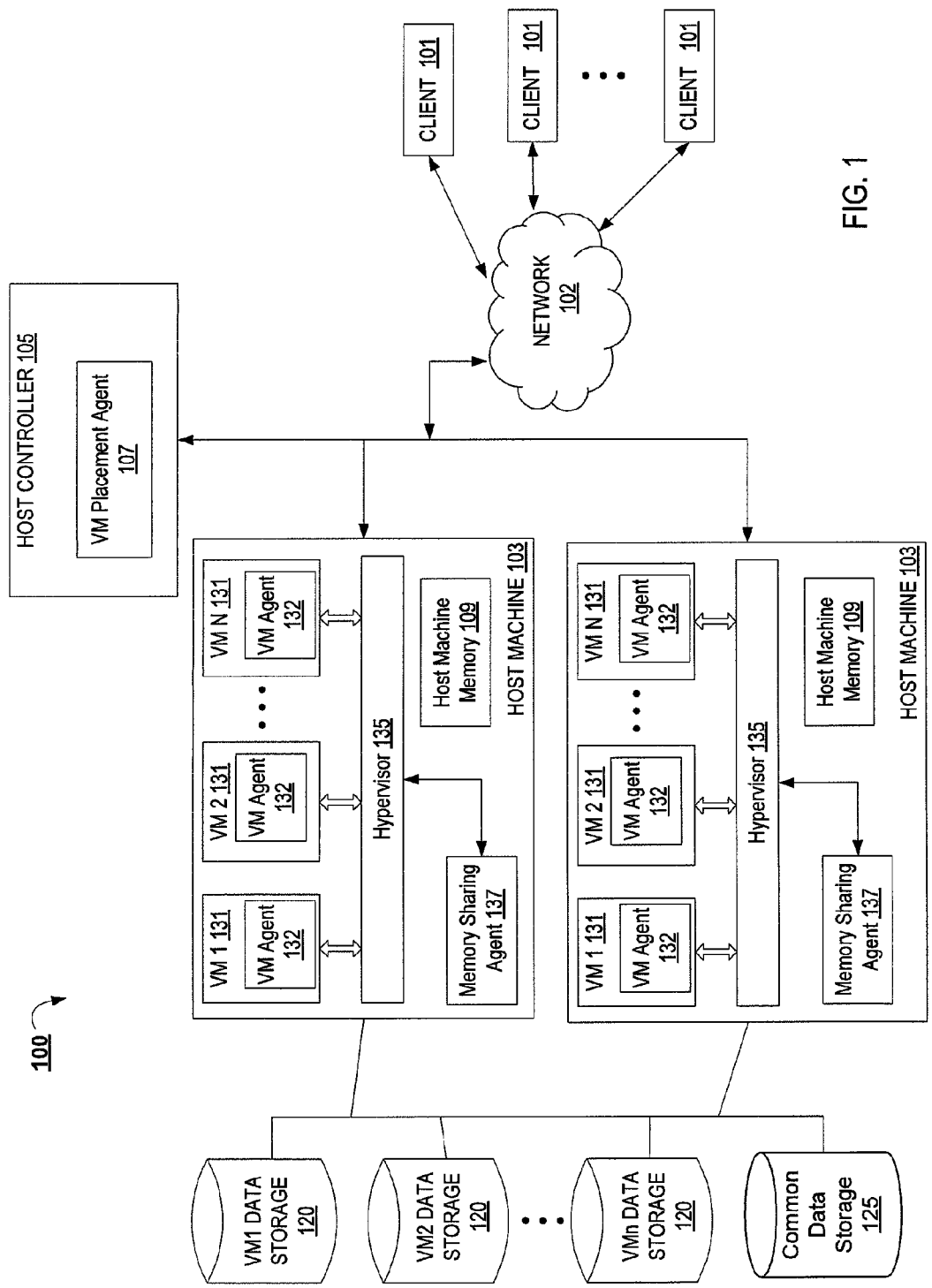
FIG. 1 is a block diagram of an exemplary network architecture in which embodiments of the invention may operate.

Embodiments of the invention provide a mechanism for optimal placement of VMs based on shared images. A method of embodiments of the invention includes identifying a virtual machine (VM) image of a new VM to be placed by a host controller on one of a plurality of candidate host machines, for each candidate host machine of the plurality of candidate host machines, identifying a VM image for each VM hosted by the candidate host machine, and determining the candidate host with the most VMs having identical VM images to the new VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for optimizing initial placement of VMs to reduce memory consumption. To reduce memory consumption in embodiments of the invention, a VM placement agent of a host controller selects an optimum host machine to place a newly-initialized VM by determining which host machine of multiple candidate host machines includes the most VMs that will share RAM memory with the newly-initialized VM to be placed. In one embodiment, identifying VMs that will share RAM memory with the newly-initialized VM includes determining a host having the most VMs with similar characteristics to the new VM. In another embodiment, identifying VMs that will share RAM memory with the newly-initialized VM includes determining a host having the most VMs with identical VM images to the new VM. Although embodiments of the invention refer to initial placement of a VM, one skilled in the art will appreciate that solutions provided in embodiments of the invention may apply equally to migration of a VM as well.

FIG. 1 illustrates an exemplary network architecture 100 in which embodiments of the present invention may operate. The network architecture 100 may include a host machine 103 coupled to one or more clients 101 over a network 102. The network 102 may be a private network (e.g., a local area network (LAN), wide area network (WAN), intranet, etc.) or a public network (e.g., the Internet). In some embodiments, clients 101 may be hosted directly by a host machine 103 as a local client on host machine 103. Host machine 103 may be part of a cluster of host machines 103. The host machine 103 may be coupled to a host controller 105 (via a network or directly). Alternatively, the host controller 105 may be part of the host machine 103.

In one embodiment, the clients 101 may include computing devices that have a wide range of processing capabilities. Some or all of the clients 101 may be thin clients, which serve as access terminals for users and depend primarily on the host machine 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host machine 103 and re-direct the received data to a display or other user interface.

In one embodiment, host machine 103 runs one or more virtual machines (VMs) 131. Each VM 131 runs a guest operating system (OS) that may be different from one another. The guest OS may include Microsoft Windows, Linux, Solaris, Mac OS, etc. The host machine 103 may include a hypervisor 135 that emulates the underlying hardware platform for the VMs 131. The hypervisor 135 may also be known as a virtual machine monitor (VMM), a kernel-based hypervisor or a host operating system.

Each VM 131 can be accessed by one or more of the clients 101 over the network 102. In one scenario, the VM 131 can provide a virtual desktop for the client 101. In other embodiments, the VM 131 may provide a virtual server for the client 101. The VMs 131 can be managed by the host controller 105, which may reside on a designated computer system (e.g., a server computer, a desktop computer, etc.) or be part of the host machine 103 or another machine. The host controller 105 may also add a VM, delete a VM, balance the load on the server cluster, provide directory service to the VMs 131, and perform other management functions.

The host machine 103 may also be coupled to data storage 120. Data storage 120 may represent multiple storage devices (e.g., disks in a disk array) associated with individual VMs 131, or a single storage device (e.g., hard drive of the host machine 103) including areas designated for individual VMs 131. When a VM 131 is created, it is associated with individual data storage 120, which may be an independent storage device or a designated area of the storage device.

The host machine 103 may further be coupled to common data storage 125 directly or remotely. Common data storage 125 may represent a designated area of the same storage device as data storage 120 (e.g., a disk drive), an independent storage device coupled with the host machine 103 directly (e.g., a disk drive) or a remote storage device (e.g., network attached storage (NAS), etc.).

In one embodiment, host controller 105 may include a VM placement agent 107. VM placement agent 107 is responsible for making a determination of which host machine 103 a VM 131 should be placed upon its creation. Although only one host machine 103 is shown in FIG. 1, for purposes of explanation assume that a plurality of host machines 103 exist in network 100. In one embodiment, VM placement agent 107 utilizes a general scheduling algorithm that considers a variety of factors for initial placement of a VM 131. Such factors may include, but are not limited to, CPU utilization, CPU speed, memory space, and memory utilization. Embodiments of the invention introduce the concept of reducing memory consumption as one of the factors for VM placement agent 107 to consider in initial placement of a VM 131 on a host machine 103.

In one embodiment, each host machine 103 includes a memory sharing agent 137 that operates to unify shared pages of VMs 131 running on that host machine 103. In one embodiment, the memory sharing agent 137 is a Kernel SamePage Merging (KSM) feature of a Linux kernel running in host machine 103. The KSM feature is generally found inside the host kernel of host machine 103. Instead of each VM 131 storing identical memory pages separately, the memory sharing agent 137 can identify these shared pages and store one copy of these memory pages in the host machine memory 109 that may be accessed by each VM 131.

To reduce memory consumption in embodiments of the invention, the VM placement agent 107 of host controller 105 selects an optimum host machine 103 to place a newly-initialized VM 131 by determining which host machine 103 includes the most VMs 131 that will share RAM memory with the newly-initialized VM 131 to be placed. Once the VM is placed on the host machine 103, the memory sharing agent 137 of that host machine 103 can unify memory pages of the newly-placed VM 131 with commonly-shared memory pages of the VMs 131 already running on the host machine 103. This unification of memory pages operates to reduce overall memory consumption on the host machine 103.

In one embodiment, selecting an optimal host machine 103 to place a newly-initialized VM includes identifying VMs 131 running on the host that have similar characteristics to the VM to be placed. Similar characteristics may include, for example, similar operating systems, similar applications, and similar libraries. In one embodiment, VM placement manager 107 communicates with VM agents 132 of each VM 131 in order to determine the current OS and the current applications running on each VM 131. In one embodiment, this communication occurs on an on-going basis whenever any changes are made at the VM. In other embodiments, the communication may occur when the VM placement agent 107 is performing the general scheduling algorithm to place a new VM and requires this information as part of embodiments of the invention.

Once the characteristics of all currently-running VMs are known, the VM placement agent 107 compares the determined characteristics with the characteristics of the VM to-be-placed in order to find similarities. The host machine 103 with the most VMs 131 having similar characteristics to the VM to-be-placed is then identified to a scheduling algorithm of the VM placement agent 107 for preferential treatment by the algorithm.

Utilizing similar characteristics in embodiments of the invention allows flexibility in placing a VM, because identical features do not have to exist in order to meet the criteria for placement. For example, a VM 131 running the same type, but not necessarily same version, of an OS and/or application as the VM to be placed may be considered to have similar characteristics for purposes of the scheduling algorithm used by the VM placement agent 107 in embodiments of the invention. The required extent of similarity for each VM characteristic and a collection of VM characteristics may be predetermined or configurable by a user (e.g., a system administrator) and stored in a data store accessible by the VM placement agent 107.

In another embodiment, selecting an optimal host machine 103 to place a newly-initialized VM includes identifying VMs 131 running on the host machine 103 that have an identical VM image template to the VM to be placed. A VM image template may include, for example, a codebase of the guest OS and applications running in the VM 131, and the libraries and data used by the guest OS and the applications. A VM image template may also include components required by all users of clients 101 (e.g., installation files of a guest OS, a web browser application, an anti-virus application, an email application, etc.) and components specific to individual users (e.g., profiles, user specific applications, etc.).

In embodiments of the invention, identifying VMs 131 running on a host machine 103 that have an identical VM image template to the VM being placed involves the VM placement agent 107 having to examine the actual VM image templates 131 stored by a host machine 103. In one embodiment, VM placement agent 107 may utilize the memory sharing agent 137 of host machine 103 to assist in locating shared or common VM images. However, VM placement agent 107 also searches individual VM storage 120 for VM image template information.

The optimal placement of VMs based on shared memory in embodiments of the invention has the effect of reducing RAM usage 109 on the host machine. For instance, in the case of placing a VM on a host running VMs with identical image templates, embodiments of the invention gain additional RAM savings (as well as the standard savings of disk storage) and improved performance due to increased usage of cache hits on the host machine. This is because when image files are accessed by the host, the host automatically caches that file in its own file system cache. These caches are per image (or a standard file because an image can actually be a file). When a VM is using a template image, it has read-only access to the base image, called the template. Over this template, a VM has an additional file to hold its image specific data. This is per-VM file with write access. When a host is running several VMs and uses either local storage or network storage file system (NFS), all of its image files and base templates are cached.

In one example scenario, assume that there are 10 different base image templates in a virtualization system. For example: 1) WINDOWS XP; 2) WINDOWS XP with Office; 3) RED HAT Enterprise Linux 5.4; 4) WINDOWS Server 2008; and so on. Many VMs can be created utilizing these base image templates. Also assume that there are 4 VMs to be allocated to 2 host machines in the virtualization system. Two of the VMs have the WinXp base image template, and the other two VMs have the Linux 5.4 base image template. Embodiments of the invention perform VM allocation by taking the shared image templates into account. The two WinXP VMs would run on host #1, and the two Linux VMs would run on host #2, thus not wasting RAM for the host cache and being able to use more RAM for caching the same images, as well as reduce the number of disk accesses, thereby gaining better performance.

FIG. 2 is a flow diagram illustrating a method 200 for optimizing initial placement of VMs to reduce memory consumption based on similar characteristics of VMs according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by VM placement agent 107 of FIG. 1.

Method 200 begins at block 210 where characteristics of a new VM to be placed are identified. Characteristics of the VM may include, for example, the operating system and applications to be run by the VM. Then, at block 220, potential candidate host machines that may host the new VM are identified (e.g., based on geographic location, an organization's department of a VM user, etc.). At block 230, for each identified candidate host machine, characteristics of each VM on the candidate host are determined via communications with a VM agent on the candidate host. In one embodiment, the communications with the VM agent are on an on-going basis and the characteristic information is stored by the host controller for future use. In other embodiments, the communication with the VM agent may occur at the time of the placement of the new VM. The VM agent is capable of identifying the current OS and the current applications running on the VM it is associated with, as well as other classified characteristics.

Subsequently, at block 240, the candidate host that includes the most VMs having similar characteristics to the VM to be placed is then identified as the optimum host to reduce memory consumption. This identification is provided to a scheduling algorithm that is used to ultimately select the candidate host on which to place the new VM. The score for the identified candidate host in the scheduling algorithm may then be adjusted accordingly to reflect the memory consumption saving that the candidate host would provide if the new VM was placed there.

Figure 3:
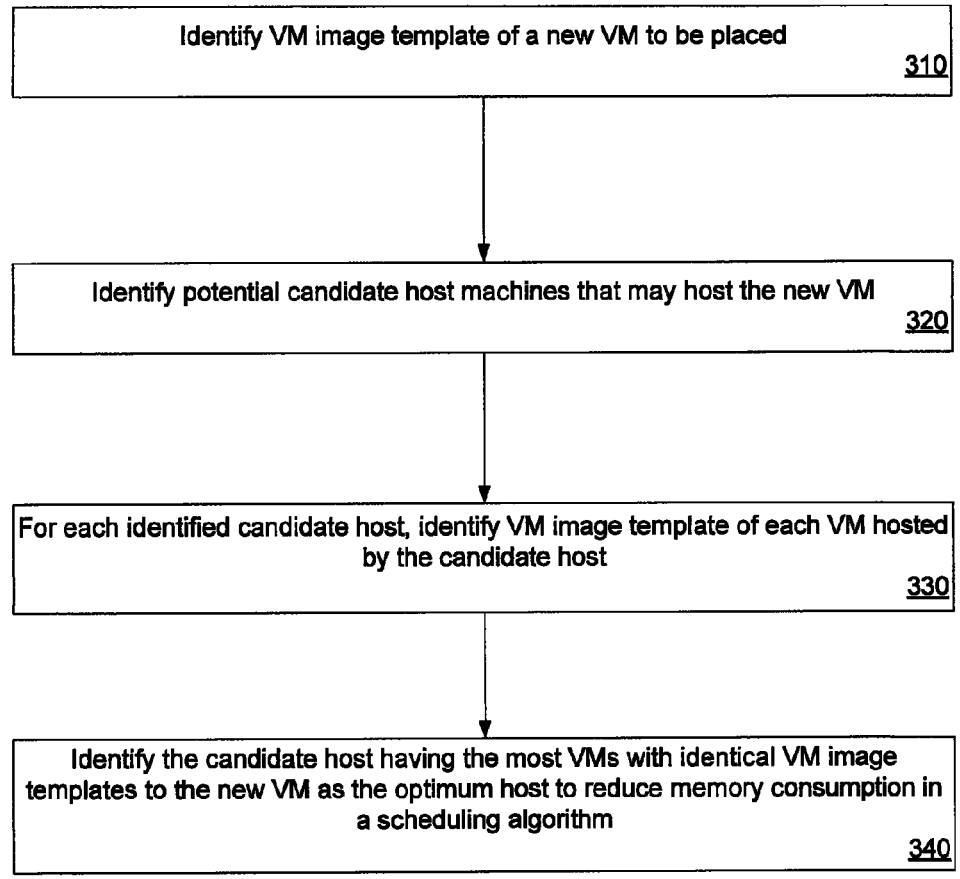
FIG. 3 is a flow diagram illustrating a method for optimizing initial placement of VMs to reduce memory consumption based on identical images of VMs according to an embodiment of the invention.

FIG. 3 is a flow diagram illustrating a method 300 for optimizing initial placement of VMs to reduce memory consumption based on identical image templates of VMs according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by VM placement agent 107 of FIG. 1.

Method 300 begins at block 310 where the VM image template of a new VM to be placed is identified. The VM image template may include, for example, a codebase of the guest OS and applications running in the VM, as well as the libraries and data used by the guest OS and the applications. A VM image template may also include components required by all users of clients 101 (e.g., installation files of a guest OS, a web browser application, an antivirus application, an email application, etc.) and components specific to individual users (e.g., profiles, user specific applications, etc.).

At block 320, potential candidate host machines that may host the new VM are identified (e.g., based on geographic location, an organization's department of a VM user, etc.). Then, at block 330, for each identified candidate host machine, the VM image template of each VM hosted by the candidate host machine is examined. In one embodiment, the VM image template is stored in individual VM data storage and/or in common storage associated with the candidate host machine. In one embodiment, a memory sharing agent may be utilized to assist in locating and identifying VM images templates of each candidate host machine.

Subsequently, at block 340, the candidate host that includes the most VMs having an identical VM image template match to the VM to be placed is then identified as the optimum host to reduce memory consumption and the number of I/O accesses outside of the host machine. This identification of the optimum host is provided to a scheduling algorithm that is used to ultimately select the candidate host on which to place the new VM. The score for the identified candidate host in the scheduling algorithm may then be adjusted accordingly to reflect the memory consumption saving that the candidate host would provide if the new VM was placed there.

Figure 4:
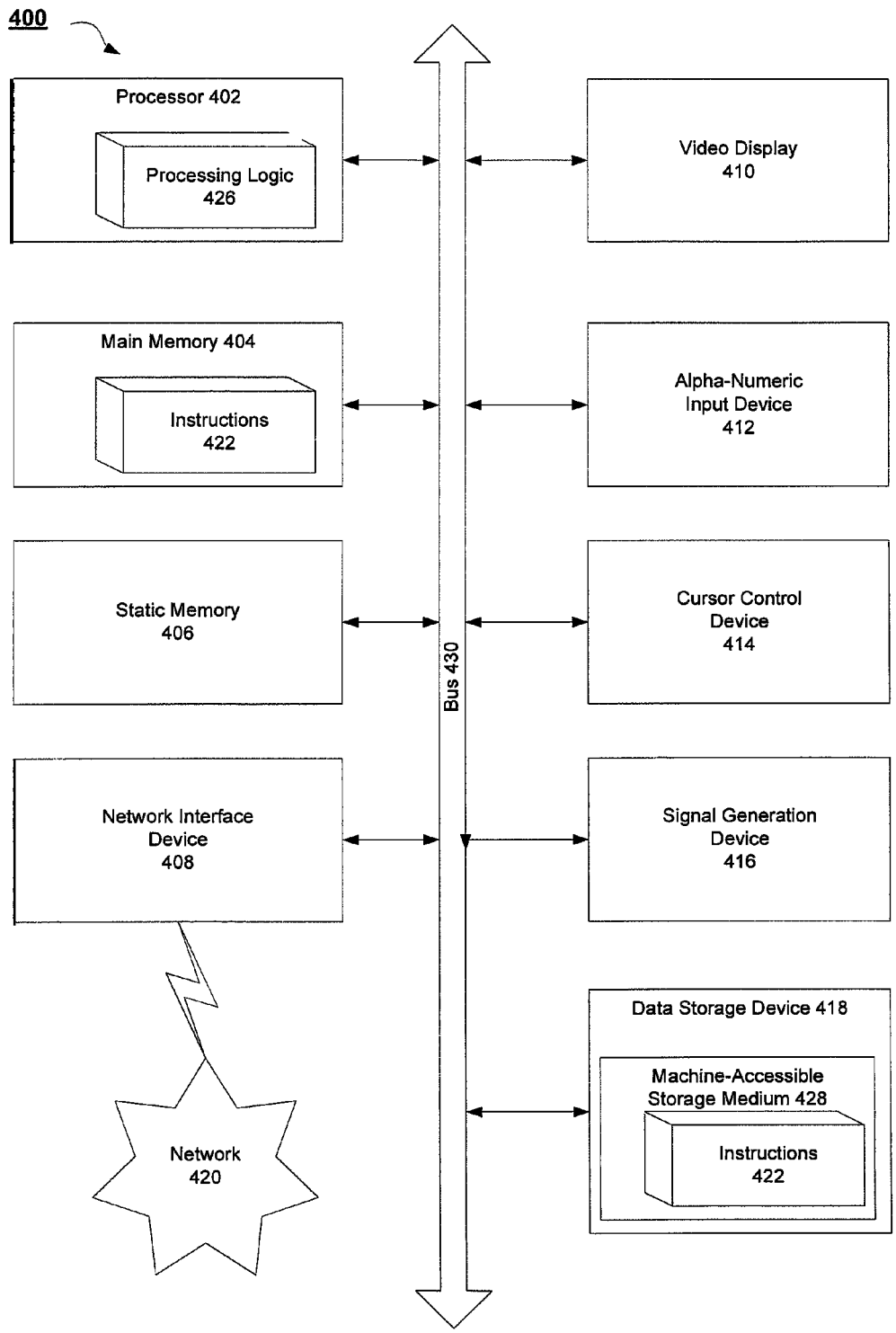
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to implement a method of optimizing initial placement of VMs to reduce memory consumption based on similar characteristics of VMs performed by VM placement agent 107 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 for optimizing initial placement of VMs to reduce memory consumption described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   identifying, by a host controller device, a virtual machine (VM) image template of a new VM to be placed by the host controller device on one of a plurality of candidate host machines;
   for each candidate host machine of the plurality of candidate host machines:
      locating, via communication with a memory sharing agent executing on the candidate host machine, a VM image template of each VM hosted by the candidate host machine, wherein the VM image template of each VM is stored on the candidate host machine in an individual storage associated with each VM or a common storage for one or more VMs; and
      identifying a number of VMs hosted by the candidate host machine associated with a VM image template that is identical to the VM image template of the new VM to be placed;
   identifying, by the host controller device, a candidate host machine from the plurality of candidate host machines comprising a most number of VMs with identical VM image templates to the VM image template of the new VM;
   selecting, by the host controller device, the identified candidate host machine to host the new VM; and
   placing, by the host controller device, the new VM on the identified candidate host machine, wherein the memory sharing agent executing on the identified candidate host machine implements a page merging feature to further consolidate memory pages of the new VM with memory pages of the VMs already hosted on the identified candidate host machine to reduce overall memory consumption on the identified candidate host machine.

2. The method of claim 1, wherein the VM image template of the new VM to be placed and each VM hosted by the candidate host machine comprises at least one of a codebase of a guest operating system (OS) of the VM, a codebase of one or more applications of the VM, libraries used by the OS and the one or more applications of the VM, or data used by the OS and the one or more applications of the VM.

3. The method of claim 1, wherein the host controller device comprises a VM placement agent to perform the locating and the identifying of the VM image templates stored on the plurality of candidate host machines, the identifying of the candidate host machine from the plurality of candidate host machines, and the selecting and the placement of the new VM on the identified candidate host machine.

4. The method of claim 1, wherein the page merging feature is a Kernel SamePage Merging (KSM) feature of a Linux™ kernel.

5. The method of claim 4, wherein the memory sharing agent is the KSM feature.

6. The method of claim 4, wherein the Linux™ kernel is running in the candidate host machine hosting the new VM.

7. A system, comprising:
   a memory;
   a processing device communicably coupled to the memory; and
   a host controller device executable from the memory and the processing device, the host controller device to:
      identify a VM image template of a new VM to be placed on one of a plurality of candidate host machines;
      for each candidate host machine of the plurality of candidate host machines:
         locate, via communication with a memory sharing agent executing on the candidate host machine, a VM image template of each VM hosted by the candidate host machine, wherein the VM image template of each VM is stored on the candidate host machine in an individual storage associated with each VM or a common storage for one or more VMs; and
         identify a number of VMs hosted by the candidate host machine associated with a VM image template that is identical to the VM image template of the new VM to be placed;
      identify a candidate host machine from the plurality of candidate host machines comprising a most number of VMs with identical VM image templates to the VM image template of the new VM;
      select the identified candidate host machine to host the new VM; and
      place the new VM on the identified candidate host machine, wherein the memory sharing agent executing on the identified candidate host machine additionally implements a page merging feature to further consolidate memory pages of the new VM with memory pages of the VMs already hosted on the identified candidate host machine to reduce overall memory consumption on the identified candidate host machine.

8. The system of claim 7, wherein the VM image template of the new VM to be placed and each VM hosted by the candidate host machine comprise at least one of a codebase of a guest operating system (OS) of the VM, a codebase of one or more applications of the VM, libraries used by the OS and the one or more applications of the VM, or data used by the OS and the one or more applications of the VM.

9. The system of claim 7, wherein the host controller device comprises a VM placement agent to perform the locating and the identifying of the VM image templates stored on the plurality of candidate host machines, the identifying of the candidate host machine from the plurality of candidate host machines, and the selecting and the placement of the new VM on the identified candidate host machine.

10. The system of claim 7, wherein the page merging feature is a Kernel SamePage Merging (KSM) feature of a Linux™ kernel.

11. The system of claim 10, wherein the memory sharing agent is the KSM feature.

12. The system of claim 10, wherein the Linux™ kernel is running in the candidate host machine hosting the new VM.

13. A non-transitory machine-readable storage medium including instructions that, when accessed by a processing device, cause the processing device to perform operations comprising:

identifying, by the processing device of a host controller device, a virtual machine (VM) image template of a new VM to be placed by the host controller device on one of a plurality of candidate host machines;

for each candidate host machine of the plurality of candidate host machines:

locating, via communication with a memory sharing agent executing on the candidate host machine, a VM image template of each VM hosted by the candidate host machine, wherein the VM image template of each VM is stored on the candidate host machine in an individual storage associated with each VM or a common storage for one or more VMs; and identifying a number of VMs hosted by the candidate host machine associated with a VM image template that is identical to the VM image template of the new VM to be placed;

identifying, by the host controller device, a candidate host machine from the plurality of candidate host machines comprising a most number of VMs with identical VM image templates to the VM image template of the new VM;

selecting, by the host controller device, the identified candidate host machine to host the new VM; and placing, by the host controller device, the new VM on the identified candidate host machine, wherein the memory sharing agent executing on the identified candidate host machine additionally implements a page merging feature to further consolidate memory pages of the new VM with memory pages of the VMs already hosted on the identified candidate host machine to reduce overall memory consumption on the identified candidate host machine.

14. The non-transitory machine-readable storage medium of claim 13, wherein the VM image template of the new VM to be placed and each VM hosted by the candidate host machine comprise at least one of a codebase of a guest operating system (OS) of the VM, a codebase of one or more applications of the VM, libraries used by the OS and the one or more applications of the VM, or data used by the OS and the one or more applications of the VM.

15. The non-transitory machine-readable storage medium of claim 13, wherein the host controller device comprises a VM placement agent to perform the locating and the identifying of the VM image templates stored on the plurality of candidate host machines, the identifying of the candidate host machine from the plurality of candidate host machines, and the selecting and the placement of the new VM on the identified candidate host machine.

16. The non-transitory machine-readable storage medium of claim 13, wherein the page merging feature is a Kernel SamePage Merging (KSM) feature of a Linux™ kernel.

17. The non-transitory machine-readable storage medium of claim 16, wherein the memory sharing agent is the KSM feature.

18. The non-transitory machine-readable storage medium of claim 16, wherein the Linux™ kernel is running in the candidate host machine hosting the new VM.

* * * * *